(12) United States Patent
Hamura et al.

(10) Patent No.: US 8,097,989 B2
(45) Date of Patent: Jan. 17, 2012

(54) RECIPROCATING LINEAR ACTUATOR

(75) Inventors: Masayuki Hamura, Yamanashi (JP); Kenzo Ebihara, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 197 days.

(21) Appl. No.: 12/474,292

(22) Filed: May 29, 2009

(65) Prior Publication Data

US 2010/0045118 A1 Feb. 25, 2010

(30) Foreign Application Priority Data

Aug. 19, 2008 (JP) .................................. 2008-210719

(51) Int. Cl.
 *H02K 33/00* (2006.01)
 *H02K 33/18* (2006.01)
 *H02K 41/02* (2006.01)

(52) U.S. Cl. ..................... 310/17; 310/12.31; 310/12.33; 310/15

(58) Field of Classification Search ............... 310/12.31, 310/15, 17; 335/285
See application file for complete search history.

(56) References Cited

U.S. PATENT DOCUMENTS

| | | | | |
|---|---|---|---|---|
| 5,952,744 A * | 9/1999 | Chitayat | ..................... | 310/12.31 |
| 5,998,889 A * | 12/1999 | Novak | ..................... | 310/12.29 |
| 6,744,155 B1 * | 6/2004 | Stoiber | ..................... | 310/15 |
| 2002/0135240 A1 | 9/2002 | Sawada et al. | | |
| 2007/0103262 A1 | 5/2007 | Kawai et al. | | |
| 2008/0079522 A1 * | 4/2008 | Okada et al. | ..................... | 335/229 |

FOREIGN PATENT DOCUMENTS

| | | |
|---|---|---|
| JP | 60223119 | 11/1985 |
| JP | 63253856 A * | 10/1988 |
| JP | 3256639 | 11/1991 |
| JP | 2002283174 | 10/2002 |
| JP | 2003-053663 A | 2/2003 |
| JP | 2007130712 | 5/2007 |

OTHER PUBLICATIONS

Notice of Reasons for Rejection for Japanese Application No. 2008-210719 issued Mar. 30, 2010.

* cited by examiner

*Primary Examiner* — Quyen Leung
*Assistant Examiner* — Eric Johnson
(74) *Attorney, Agent, or Firm* — Lowe Hauptman Ham & Berner LLP

(57) ABSTRACT

A reciprocating linear actuator in which a slide and a counter slide are arranged for linear movement within a hollow guide. The actuator has driving force generating means for generating a driving force between the slide and the counter slide and also has bearing structures formed individually between the guide and the slide and between the guide and the counter slide. If an external force acts on the slide, the external force is transmitted from the slide to the guide through the bearing structure between them.

8 Claims, 10 Drawing Sheets

VERTICALLY DOWNWARD

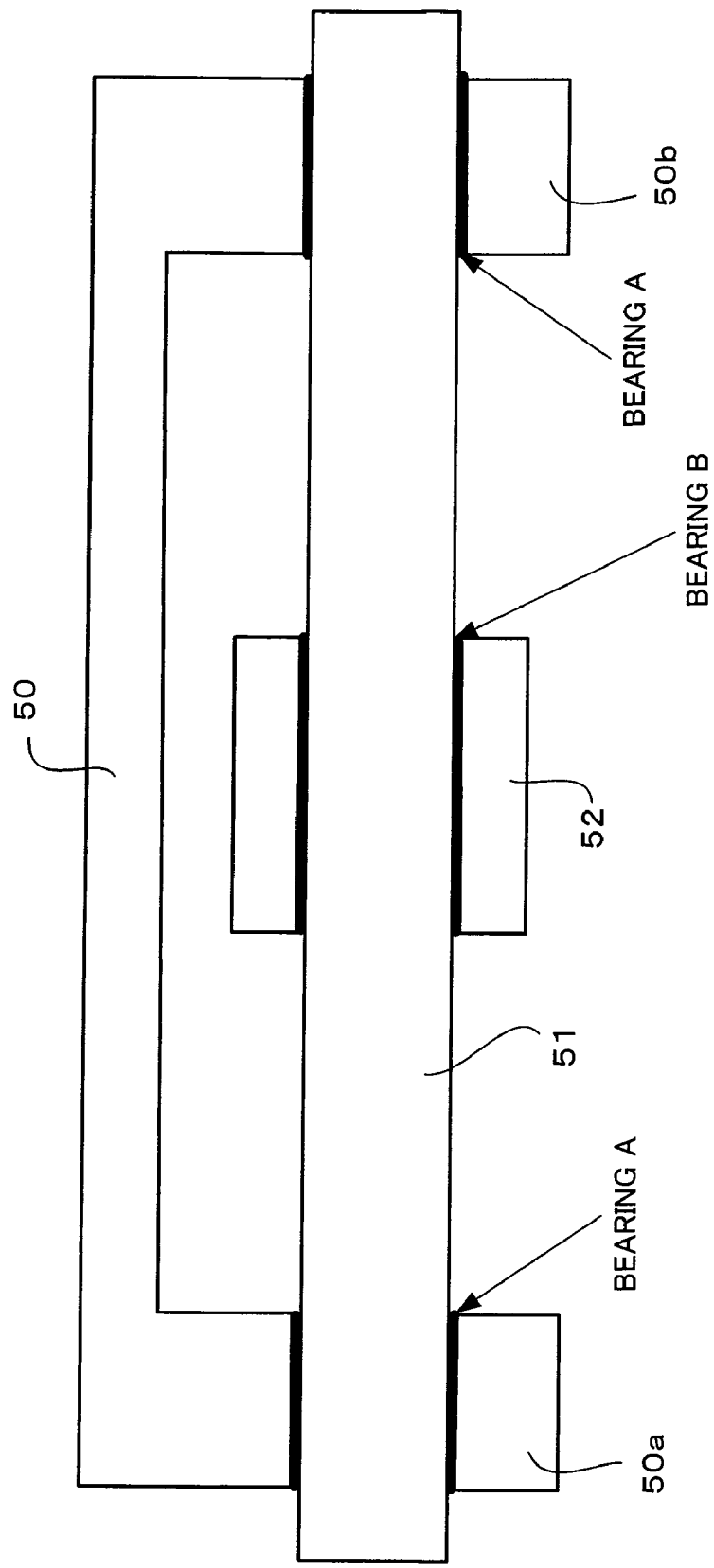

RECIPROCATING LINEAR ACTUATOR

RELATED APPLICATIONS

The present application is based on, and claims priority from, Japanese Application Number 2008-210719, filed Aug. 19, 2008, the disclosure of which is hereby incorporated by reference herein in its entirety.

BACKGROUND OF THE INVENTION

1. Field of the Invention

The present invention relates to a reciprocating linear actuator with high bearing stiffness.

2. Description of the Related Art

Die sets for molding diffraction gratings and light guide plates of liquid crystal display units are expected to be formed with tens of thousands of grooves with a pitch of several microns. Cutting these numerous grooves requires both high speed and high precision. Further, the die sets for diffraction gratings and light guide plates should be free from the smallest machining errors, with the result that smooth linear drive is essential in order to prevent vibration even during high-speed operation.

If a reciprocating motion is made at high speed in a conventional linear actuator, a reaction is caused by acceleration and deceleration. If machining requires a constant feed speed, in particular, the acceleration and deceleration are performed in a short stroke (i.e., in a short time), with the result that a greater reaction is produced. A precision processing machine that performs high-precision machining is supported by means of an air damper in order to suppress the propagation of floor vibration, so that it is easily shaken by a reaction of its drive shaft.

US Patent Application Publication No. 2007/010326 A1 (publication date: May 10, 2007), for example, discloses a method of canceling a reaction that is produced when a slide of a reciprocating linear actuator is reciprocated at high speed with respect to a guide. In the reciprocating linear actuator disclosed in this patent document, the guide and the slide that are movable coaxially with a base as a fixed portion are supported on the base through a fluid dynamic bearing, and the guide receives a reaction of acceleration and deceleration of the slide, so that the reaction cannot be transmitted to the outside.

FIGS. 9 and 10 are views illustrating the reciprocating linear actuator disclosed in the patent document mentioned above. FIG. 9 is an external perspective view of the reciprocating linear actuator, and FIG. 10 is a sectional view of the actuator taken along line X-X of FIG. 9.

A base 50 of the reciprocating linear actuator is fixedly set in a predetermined position in a machine tool (not shown). The base 50 supports the opposite end portions of a guide 51 with the aid of first bearings A. A slide 52 is supported on the guide 51 for movement in the axial direction of the guide by a second bearing B. The slide 52 and the guide 51 are movable in the same direction. By moving in opposite directions, the guide 51 and the slide 52 can cancel a reaction that is produced when the reciprocating linear actuator is driven. Permanent magnets 53 for reversal are mounted on the guide 51. Further, a coil and permanent magnets for reversal (not shown) that constitute a linear motor are mounted within the slide 52. Fluid bearings can be used for the first and second bearings A and B.

In the reciprocating linear actuator disclosed in the patent document mentioned above, if an external force in any other direction than a driving direction acts on the slide 52, it is transmitted to the slide 52, the bearing B between the guide 51 and the slide 52, the guide 51, the bearing A between the base 50 and the guide 51, and the base 50, in the order named. In short, the external force applied to the slide 52 is transmitted to the base 50 through the first and second bearings A and B.

A fluid bearing (air bearing), in particular, is a part that is lower in stiffness than any other structural parts, and it can be regarded as an elastic body that is displaced in proportion to an applied force. If the force is transmitted through the two bearings A and B, it practically means that two elastic bodies are connected in series, so that the stiffness of the bearings is reduced.

When the reciprocating linear actuator is driven, moreover, the guide 51 and the slide 52 move simultaneously, so that the straight motion accuracy of the slide 52 with respect to the base 50 is determined by combining the straight motion accuracy of the guide 51 with respect to the base 50 and the straight motion accuracy of the slide 52 with respect to the guide 51. Thus, such combined straight motion accuracy tends to be poorer than a straight motion accuracy resulting from a simple structure composed of only the guide 51 and the slide 52.

As shown in FIG. 10, the straight motion accuracy of the slide 52 is influenced by only the component shape accuracy of the guide 51. In reality, however, the straight motion accuracy of the slide 52 is influenced not only by the straightness of that part (bearing B) of the guide 51 on which the slide 52 moves but also by the straightness of that part (bearing A) of the guide 51 which moves relatively to the base 50, as mentioned before. Thus, the overall straightness of the guide 51 influences the straight motion accuracy of the slide 52, with the result that the guide 51 must be finished with high precision throughout the length of the guide 51.

As mentioned before, the conventional reciprocating linear actuator has a problem that the bearing stiffness of the slide 52 with respect to the base 50 is reduced due to the use of the double bearing structure, including the bearing A between the base 50 and the guide 51 and the bearing B between the slide 52 and the guide 51. There is another problem that the straight motion accuracy of the slide 52 during the drive is reduced as the resultant of the straight motion accuracy of the slide 52 with respect to the guide 51 and that of the guide 51 with respect to the base 50.

SUMMARY OF THE INVENTION

The object of the present invention is, for achieving the problems described above, to provide a reciprocating linear actuator in which a motion of a slide is not supported by a double bearing structure so that high bearing stiffness is ensured without a reduction in straight motion accuracy.

A reciprocating linear actuator according to the invention comprises: a hollow guide; a slide and a counter slide each of which is arranged within the guide so as to be movable in the direction parallel to the axis of the guide; a first bearing structure formed between the guide and the slide; a second bearing structure formed between the guide and the counter slide; and driving force generating means for generating a driving force between the slide and the counter slide. If an external force acts on the slide, the external force is transmitted from the slide to the guide through the first bearing structure.

The counter slide may include first and second bearing portions connected to each other and the slide may be driven to move between the first and second bearing portions by means of the driving force generating means.

The reciprocating linear actuator may further comprise repulsive force generating means (e.g., permanent magnet) for generating a repulsive force disposed between the slide and the counter slide, and wherein the repulsive force generated by the repulsive force generating means may be used when the slide is reversed.

The guide may have a box-like structure of rectangular parallelepiped (or of a triangular cross section) and the bearing structures may be disposed individually between the inside of the box-like structure and the outsides of the slide and the counter slide.

The guide may be provided with a lid on at least one end thereof, and a space surrounded by the inner surface of the guide, the lid and the counter slid may be used as an air balance chamber such that the dead weight of the counter slide is canceled by means of a (positive or negative) pressure in the air balance chamber when the slide is driven vertically.

The slide may be provided with means for mounting a tool and means for advancing and retracting the tool mounted by the tool mounting means in the direction perpendicular to the direction of movement of the slide.

According to the present invention, there may be provided a reciprocating linear actuator with the above-described configuration, in which use of a double bearing structure is avoided so that high bearing stiffness is ensured without a reduction in straight motion accuracy.

BRIEF DESCRIPTION OF THE DRAWINGS

The above and other objects and features of the present invention will be obvious from the ensuing description of embodiments with reference to the accompanying drawings, in which:

FIG. 10 is a sectional view of the reciprocating linear actuator taken along line X-X of FIG. 9.

DETAILED DESCRIPTION OF THE PREFERRED EMBODIMENTS

Figure 1:
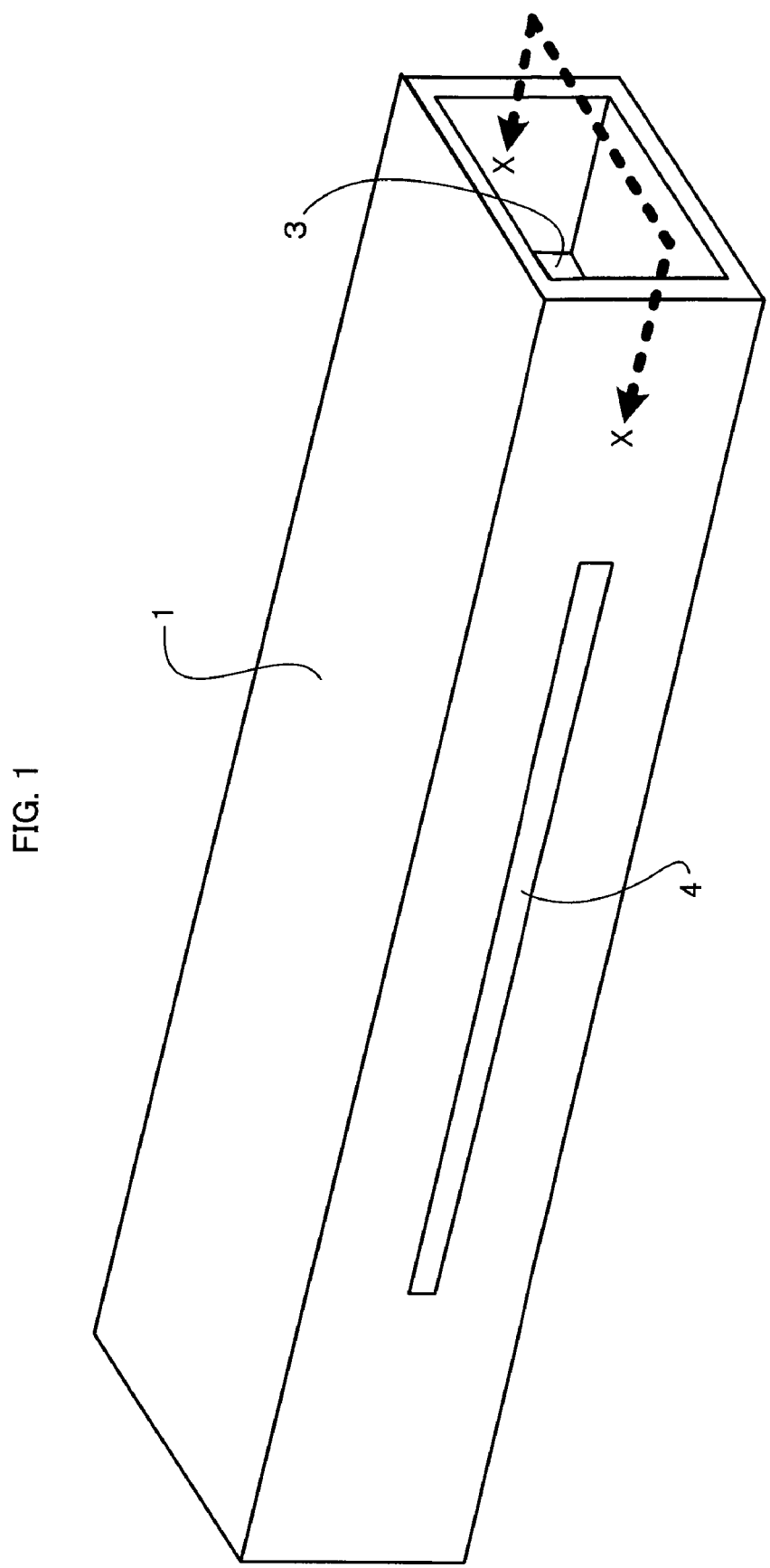
FIG. 1 is an external perspective view of a reciprocating linear actuator according to a first embodiment of the invention.

FIG. 1 is an external perspective view of a reciprocating linear actuator according to a first embodiment of the present invention. This reciprocating linear actuator is attached to a machine tool (not shown) in such a manner that predetermined portions of the outer surface of its guide is fixed to the axis of the machine tool by using a fixing member (not shown).

Figure 7:
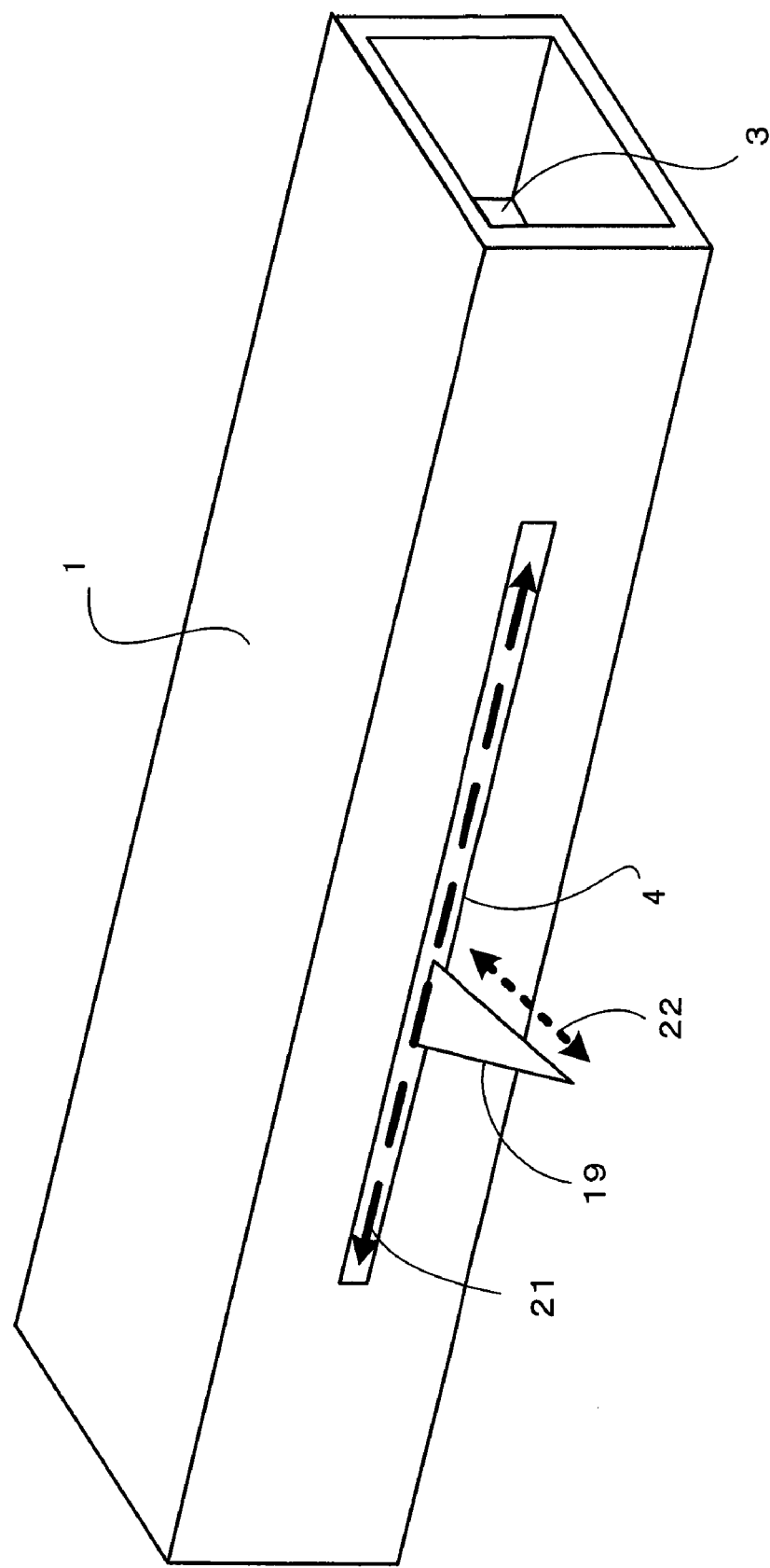
FIG. 7 is an external perspective view of the reciprocating linear actuator according to any of the embodiments of the invention fitted with the tool shown in FIGS. 6A and 6B.

A guide 1 is in the form of a hollow box that is open at both axial ends. A slide 2 and a counter slide 3 are arranged in a hollow portion of the guide 1. In FIG. 1, a part of the counter slide 3 can be seen through one end opening of the box-like guide 1. The slide 2 and the counter slide 3 will be described in detail with reference to FIGS. 2 and 3. A slit 4 is formed in at least one side surface of the guide 1 so as to extend parallel to an axis that connects the respective centers of the opposite end openings. As shown in FIG. 7, a tool 19 that is attached to the slide 2 projects out of the guide 1 through the slit 4 and reciprocates along the slit 4.

Figure 2:
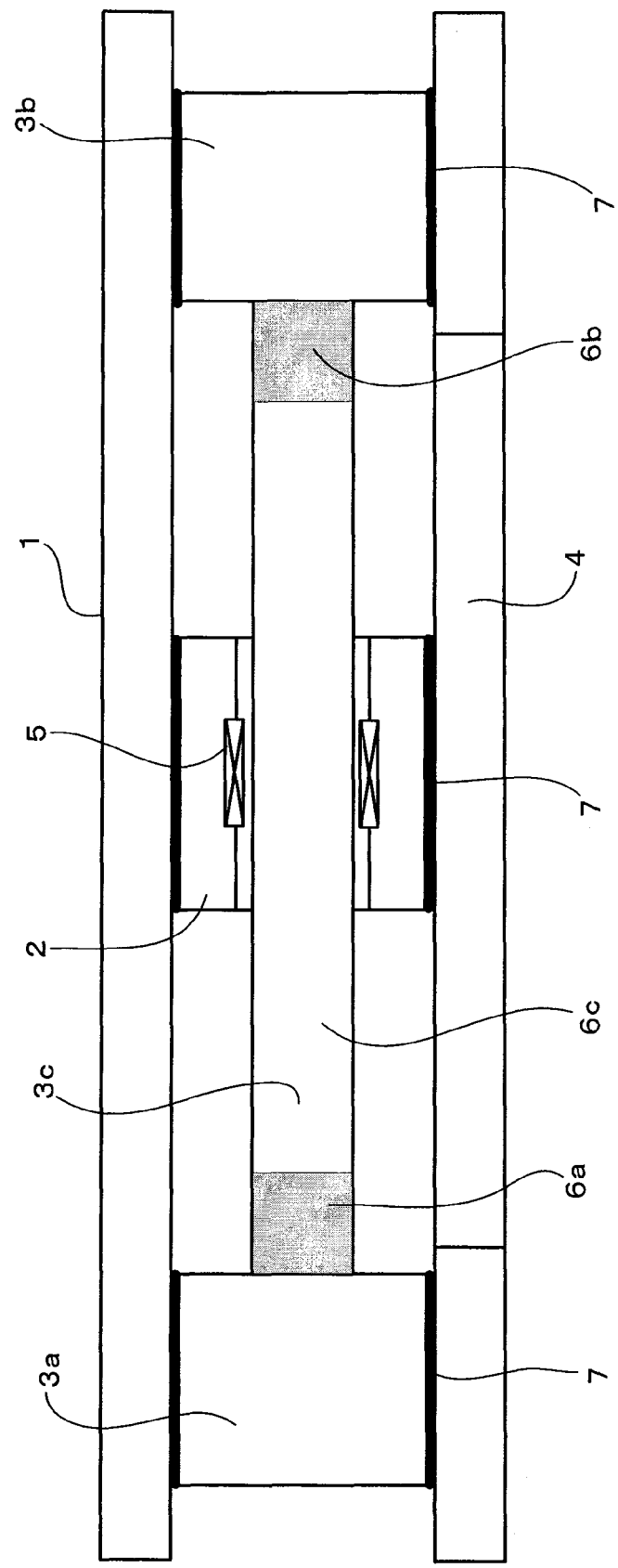
FIG. 2 is a sectional view of the reciprocating linear actuator (hollow box-like guide) taken along line X-X of FIG. 1.

FIG. 2 is a sectional view of the reciprocating linear actuator (hollow box-like guide 1) taken along line X-X of FIG. 1. The counter slide 3 is composed of two bearing portions 3a and 3b and a connecting portion 3c that connects the bearing portions 3a and 3b.

The slide 2 and the counter slide 3 are supported in the guide 1 by a fluid bearing, which has bearing surfaces on inside surfaces of the guide 1 and outside surfaces of the slides 2 and on inside surfaces of the guide 1 and outside surfaces of the counter slides 3, so that both the slides 2 and the counter slides 3 are movable in the axial direction of the guide 1. As mentioned before, the fluid bearing (air bearing) is a part that is lower in stiffness than any other structural parts, and it can be regarded as an elastic body that is displaced in proportion to an applied force. Since the slide 2 and the counter slide 3 share the bearing surfaces in common, the guide 1 can be constructed in the form of a simple hollow box.

The slide 2 is a member to which the tool 19 (see FIG. 6) is attached. The slide 2 is provided with a coil 5 that generates a thrust in the guide 1, whereby the slide 2 can be supported by the fluid bearing as it reciprocates. Further, the slide 2 is provided with a fluid inlet (not shown) and fluid piping (not shown) that communicates with the fluid inlet. The slide 2 is supported in the guide 1 by the fluid bearing in such a manner that a compressed fluid (e.g., compressed air) introduced into the fluid piping is jetted onto the bearing surfaces of the guide 1 through a fluid nozzle (not shown) in the slide 2. Further, the slide 2 is provided with a feeder for feeding electricity to the coil 5.

Each of the bearing portions 3a and 3b that constitute the counter slide 3 is provided with a fluid inlet (not shown) and fluid piping (not shown) that communicates with the fluid inlet. Each bearing portion of the counter slide 3 is movably supported in the guide 1 by the fluid bearing in such a manner that a compressed fluid (e.g., compressed air) introduced into the fluid piping is jetted onto the bearing surfaces of the guide 1 through a fluid nozzle (not shown) in the bearing portion.

Permanent magnets 6a and 6b and a core 6c are mounted on the connecting portion 3c that connects the bearing portions 3a and 3b. The slide 2 is driven by a thrust that is generated between the driving permanent magnets 6a and 6b and the coil 5 mounted on the slide 2. Thus, the permanent magnets 6a and 6b and the coil 5 constitute a linear motor (driving force generating means).

Also in a reciprocating linear actuator shown in FIGS. 3, 4, 5 and 8 (mentioned later), as in the one shown in FIG. 2, a coil 5 mounted on a slide 2 and driving permanent magnets 6a and 6b on the connecting portion 3c form a linear motor.

The following is a description of reciprocation of the slide 2. The linear motor is driven by supplying current to the coil 5 on the slide 2, whereupon the slide 2 is moved in one direction. When the slide 2 reaches one stroke end of its reciprocation, the current supplied to the coil 5 is redirected to reverse the moving direction of the slide 2. When the slide 2 moves to the other stroke end, the current supplied to the coil 5 is redirected again to reverse the moving direction of the slide 2. Thus, the slide 2 reciprocates between the driving permanent magnets 6a and 6b.

Since a force to drive the slide 2 is generated between the slide 2 and the counter slide 3, the slides 2 and 3 are subjected to opposite driving forces based on the law of action and reaction. Accordingly, these driving forces cancel each other out and are not transmitted to the guide 1, so that a reaction force that is generated by acceleration and deceleration of the slide 2 cannot be transmitted to the outside (e.g., to the machine tool).

Now let us suppose that an external force is applied in any other direction than the driving direction of the slide 2. This force is transmitted from the slide 2 to the guide 1 through a bearing between the slide 2 and the guide 1. Thus, according to the present invention, the force applied to the slide is transmitted to the guide 1 through the only one bearing. Therefore, the bearing has so high stiffness that it is free from the problem of reduction in stiffness peculiar to a multiple bearing structure. This feature can be easily understood by comparison with the case of the prior art reciprocating linear actuator shown in FIG. 10 (in which the force applied to the slide 52 is transmitted to the base 50 through the bearing B, guide 51, and bearing A, as mentioned before) that suffers a reduction in bearing stiffness attributable to the multiple bearing structure.

The straight motion accuracy of the slide 2 is influenced only by the straightness of a guide surface of the guide 1 along which the slide 2 moves, and is not influenced by guide surfaces of the guide 1 along which the bearing portions 3a and 3b of the counter slide 3 move. Therefore, the inner surface of the guide 1 need not be finished with high precision throughout its length, that is, only the guide surface of the guide 1 along which the slide 2 moves should be highly accurately finished. Thus, the production efficiency of the members that constitute the reciprocating linear actuator is improved.

In the first embodiment of the present invention shown in FIG. 2, the inside surfaces of the hollow box-like guide 1 are used as the bearing surfaces, so that the respective weights of the slide 2 and the counter slide 3 can be reduced. In the prior art reciprocating linear actuator described with reference to FIG. 10, the slide 52 is located outside the surface of the bearing B of the guide 51. In the reciprocating linear actuator of the first embodiment of the invention shown in FIG. 2, on the other hand, the slide 2 is located inside the bearing surfaces of the guide 1. It is to be understood, therefore, that the slide of the first embodiment can be made lighter in weight than that of the prior art actuator. The reduced weight of the slide 2 provides an advantage that the power consumption of the driving linear motor during acceleration and deceleration can be reduced to suppress heat generation.

In order to shorten the movement stroke of the counter slide 3 (equivalent to the guide 51 of the prior art reciprocating linear actuator shown in FIG. 10) to reduce the overall size of the reciprocating linear actuator, the counter slide 3 for absorbing the momentum of the reaction force from the counter slide 3 should be several to tens of times heavier than the slide 2. If the weight of the slide 2 itself is reduced, therefore, that of the counter slide 3 can also be reduced, and in consequence, the overall weight of the reciprocating linear actuator can be reduced. In this point of view, the weight of the slide 2 can be reduced by triangulating the cross section of the hollow portion of the guide 1, perpendicular to the axial direction of a region where the slide 2 reciprocates, and also triangulating the slide 2 that reciprocates within the triangular-profiled hollow portion of the guide. The hollow portion of the guide 1 and the slide (i.e., the reciprocating linear actuator) may be of any of various profiles, such as circular cross section or polygonal cross section. For ease of manufacture of such guide and slide, however, circular cross section or polygonal cross section would be desirable.

Figure 3:
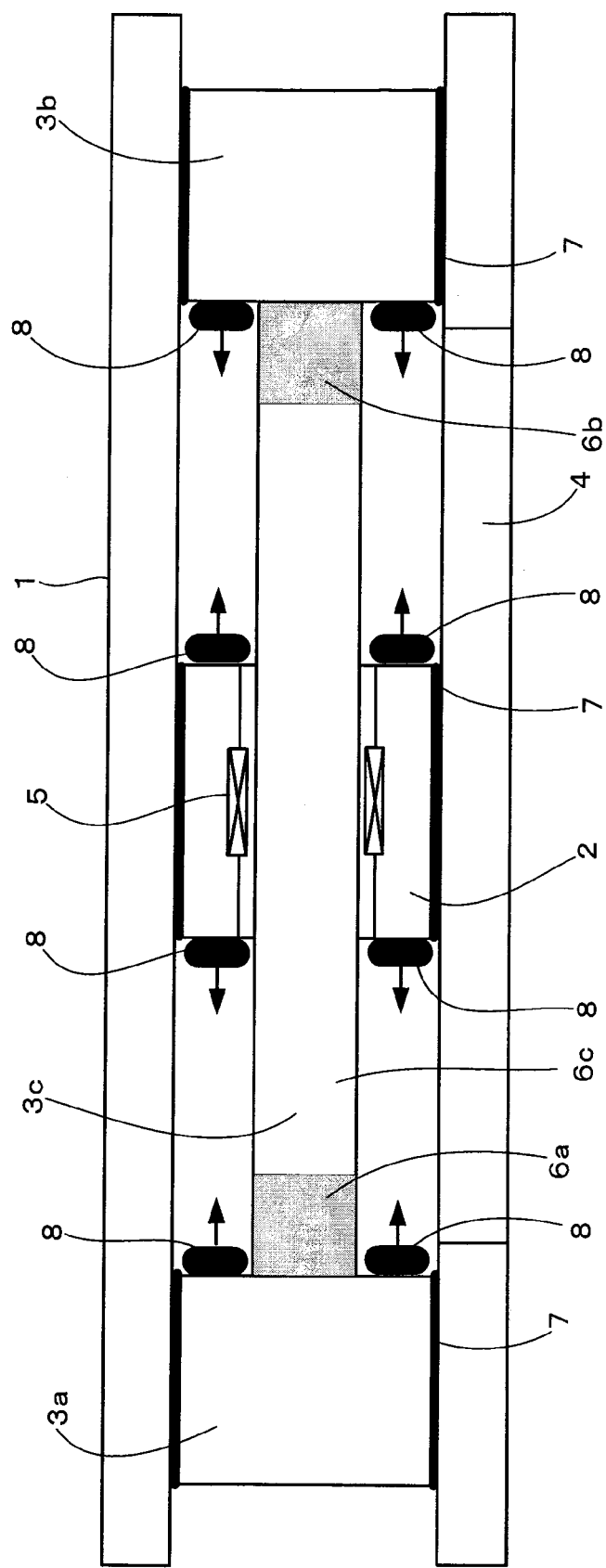
FIG. 3 is a sectional view of a reciprocating linear actuator according to a second embodiment of the invention.

FIG. 3 is a sectional view of a reciprocating linear actuator according to a second embodiment of the invention. In this embodiment, permanent magnets 8 for intensifying the force to reverse a slide 2 are added to the reciprocating linear actuator of the first embodiment shown in FIG. 2.

Permanent magnets 8 are arranged individually on the sides of the slide 2 and bearing portions 3a and 3b of a counter slide 3. The respective poles of the magnets 8 are oriented so that a repulsive force is generated when the slide 2 approaches the bearing portion 3a or 3b of the counter slide. These permanent magnets 8 generate a reaction force to reverse the slide 2. When the distances between the magnets 8 on the slide 2 and their corresponding magnets 8 on the bearing portions 3a and 3b of the counter slide 3 become shorter, repulsive forces are generated such that the slide 2 is sharply decelerated and then accelerated in the reverse direction by a reverse force. Arrows shown in FIG. 3 individually indicate the directions of the poles of the permanent magnets 8.

In order to generate the repulsive forces between the slide 2 and the bearing portions 3a and 3b of the counter slide 3, the slide 2 and the bearing portions 3a and 3b may be connected to one another by means of springs in place of the permanent magnets. According to this method, however, the forces of the springs continually act on the slide 2. If the slide 2 is continually subjected to the force, it is bound to be accelerated or decelerated, so that it is difficult to keep the speed of the slide 2 constant.

If the repulsive forces are generated by using the permanent magnets, as in the present embodiment, on the other hand, they act between the slide 2 and the bearing portions 3a and 3b of the counter slide 3 only when the distances between them are shortened. This is an advantage of this arrangement over the connection by the springs.

Figure 4:
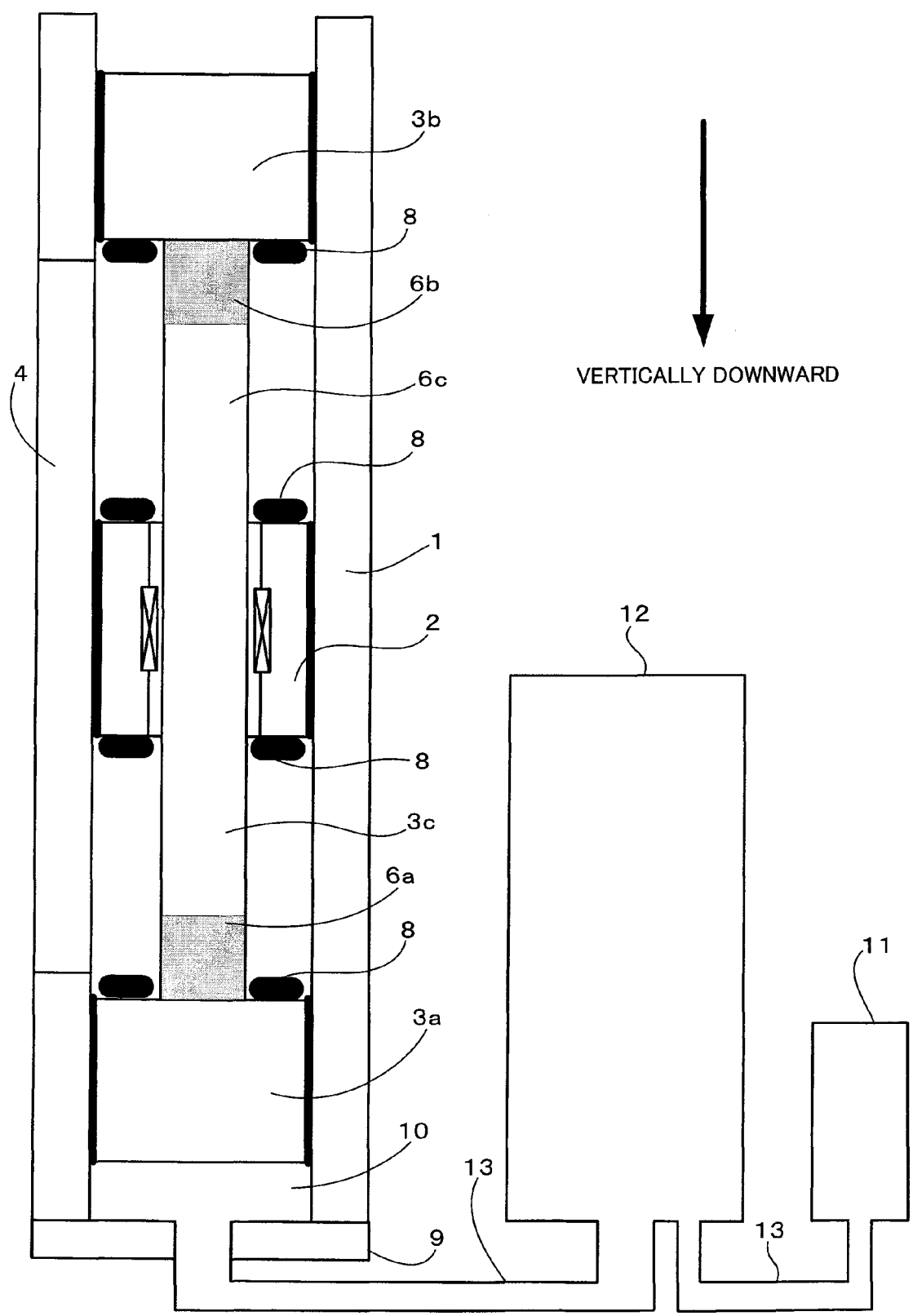
FIG. 4 is a sectional view of a reciprocating linear actuator according to a third embodiment of the invention.

FIG. 4 is a sectional view of a reciprocating linear actuator according to a third embodiment of the invention. The reciprocating linear actuator of this embodiment is oriented vertically.

In order to drive the reciprocating linear actuator thus oriented vertically, it is necessary to cancel the dead weight of a counter slide 3. To attain this, an air balance chamber 10 is defined in a space surrounded by the inner surface of a guide 1, an end face of a bearing portion 3a of the counter slide 3, and a lid 9 that closes one end (lower end) of the guide 1 (hollow box). The air balance chamber 10 and a pressure generator 11 are made to communicate with each other through a pipe 13 and a tank 12. As a positive pressure is generated by the pressure generator 11 to feed air into the air balance chamber 10, the internal pressure of the chamber 10 is kept positive so as to push up the counter slide 3.

If a slide 2 is reciprocated at high speed, the counter slide 3 is also reciprocated at high speed by reaction. As this is done, the capacity of the air balance chamber 10 changes quickly. If the air balance chamber 10 is a closed space, the change in capacity is transmitted as a change in pressure to the guide 1 via the lid 9. Thus, the driving force of the slide 2 is inevitably transmitted to the outside.

According to the present embodiment, however, the air balance chamber 10 is connected to the tank 12 that is provided outside, so that the apparent capacity of the air balance chamber 10 is large. Therefore, the pressure fluctuation in the air balance chamber 10 is reduced. This pressure fluctuation is settled depending on the capacity change in the air balance chamber 10 and the capacity of the tank 12. If a capacity change of 20 milliliters is caused in the air balance chamber 10 that has a capacity of 2 liters, for example, the pressure fluctuation in the air balance chamber 10 is reduced to one hundredth.

Figure 5:
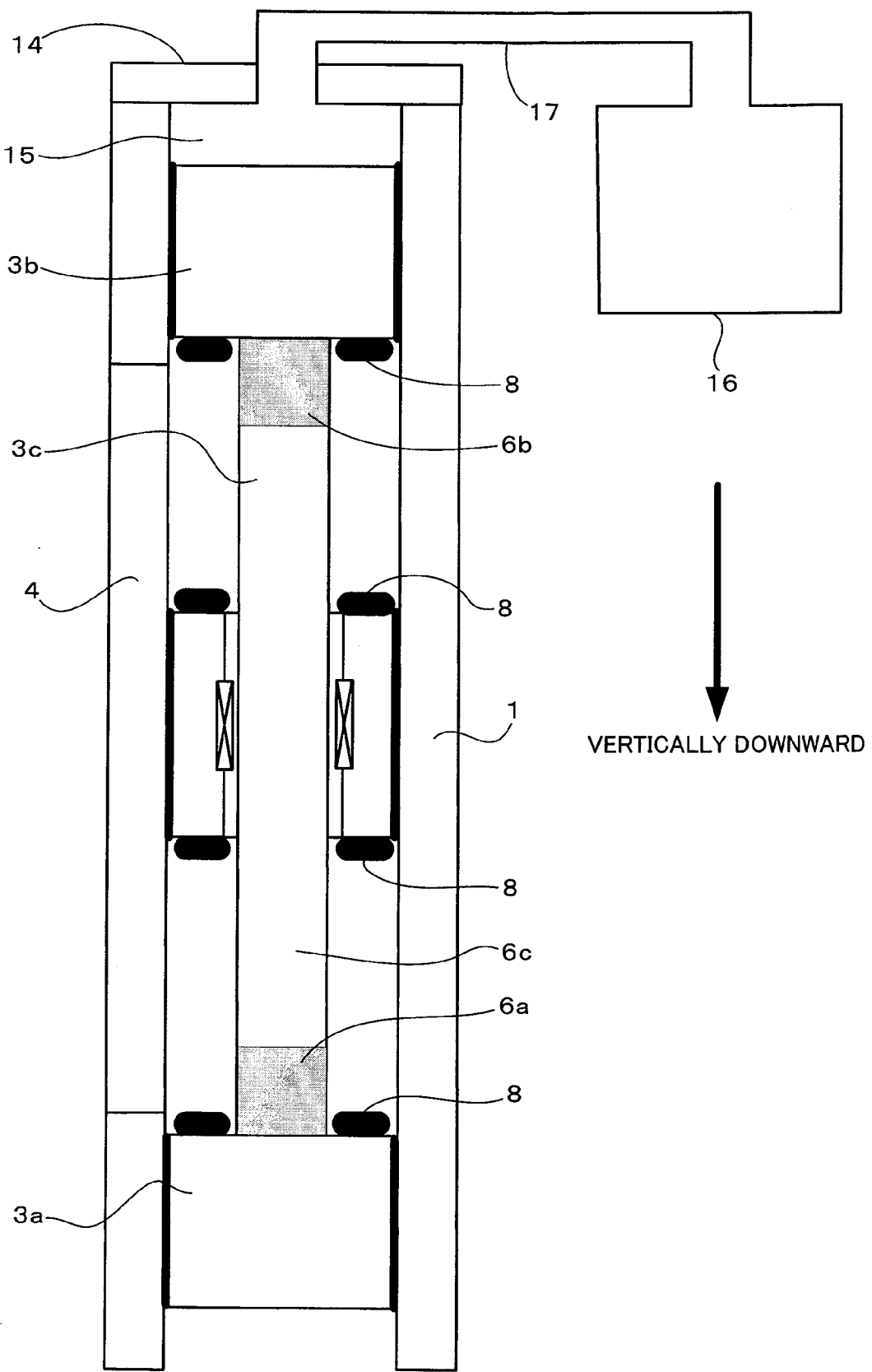
FIG. 5 is a sectional view of a reciprocating linear actuator according to a fourth embodiment of the invention.

FIG. 5 is a sectional view of a reciprocating linear actuator according to a fourth embodiment of the invention. The reciprocating linear actuator of this embodiment is oriented vertically.

In order to drive the reciprocating linear actuator thus oriented vertically, it is necessary to cancel the dead weight of a counter slide 3. To attain this, an air balance chamber 15 is defined in a space surrounded by the inner surface of a guide 1, an end face of a bearing portion 3b of the counter slide 3, and a lid 14 that closes one end (upper end) of the guide 1 (hollow box). The air balance chamber 15 and a vacuum generator 16 are made to communicate with each other through a pipe 17, and the internal pressure of the chamber 15 is made negative by the vacuum generator 16. The dead weight of the counter slide 3 can be canceled by adjusting the negative pressure to balance it by means of the vacuum generator 16.

The present embodiment in which the negative pressure is used to cancel the dead weight of the counter slide 3 has an advantage over the embodiment of FIG. 4 in which the positive pressure is used to cancel the dead weight of the counter slide 3 in that a change in pressure can be securely reduced without using an external tank.

Figure 6A:
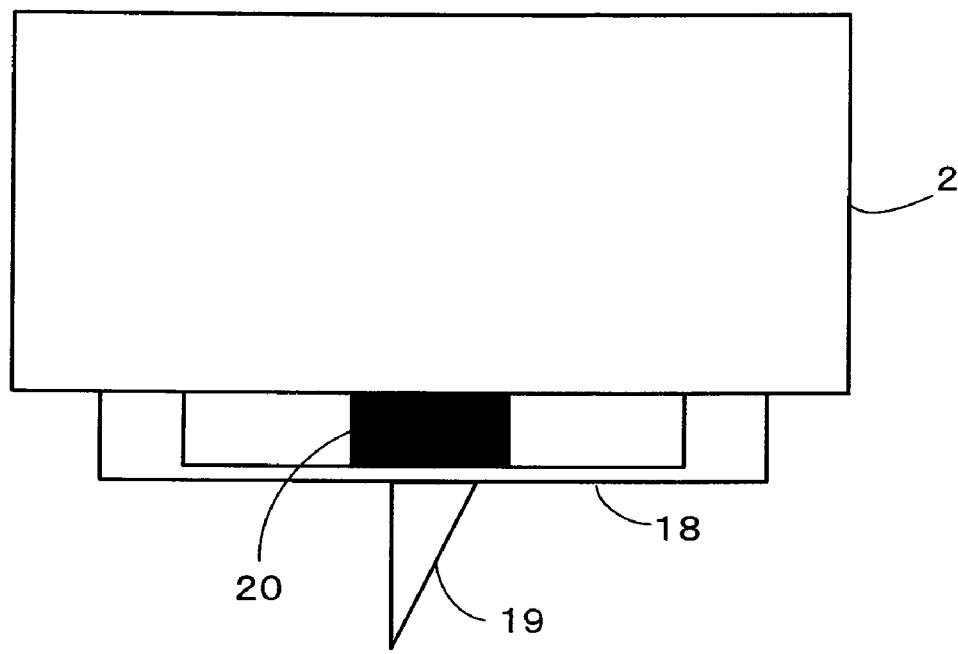
FIG. 6A is a view illustrating how a tool is attached to a slide of the reciprocating linear actuator.
Figure 6B:
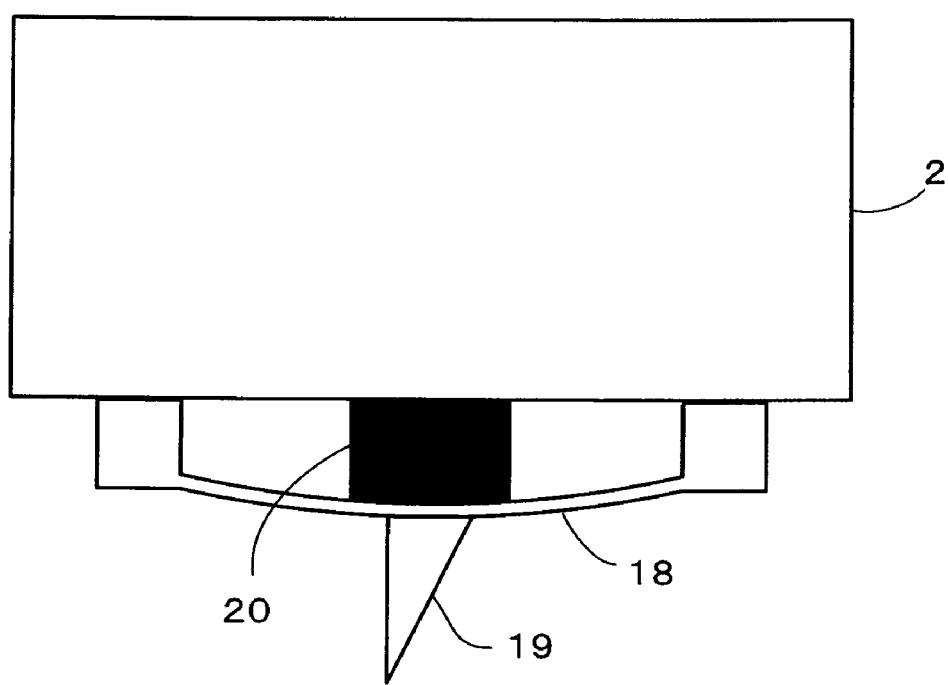
FIG. 6B is a view illustrating how the tool of FIG. 6A is displaced in a cutting direction.

FIGS. 6A and 6B are views showing a tool attached to the slide 2.

As shown in FIG. 6A, a leaf spring 18 and a piezoelectric element 20 are mounted on the slide 2, and the tool 19 is attached to the leaf spring 18. When a voltage is applied to the piezoelectric element 20, the element 20 extends so that the tool 19 is displaced in a cutting direction, as shown in FIG. 6B. The tool 19 is displaced in the cutting direction (FIG. 6B) in an outward stroke of the slide 2. In a return stroke, on the other hand, the voltage supply to the piezoelectric element 20 is stopped so that the tool 19 is retracted (FIG. 6A), whereupon draw cutting is performed by the tool 19.

FIG. 7 is an external perspective view of the reciprocating linear actuator according to any of the embodiments fitted with the tool shown in FIGS. 6A and 6B.

The tool 19 projects outward from the guide 1 through the slit 4 in at least one side surface of the guide 1. The tool 19 linearly reciprocates in the direction shown by arrows 21. In the outward stroke of the linear reciprocation, as shown in FIG. 6B, a voltage is supplied to the piezoelectric element 20 to extend it. Thereupon, the tool 19 is displaced in the cutting direction or outward direction shown by arrows 22, whereby a workpiece is notched. In the return stroke of the linear reciprocation, as shown in FIG. 6A, on the other hand, the voltage supply to the piezoelectric element 20 is stopped so that the element 20 is contracted, whereupon the tool 19 is retracted in the inward direction of the arrow 22.

Thus, the slide 2 is reciprocated by redirecting the electric current flow in the coil 5 on the slide 2. In the outward stroke of this reciprocation of the slide 2, for example, a predetermined voltage is applied to the piezoelectric element 20 to extend it by control means for drivingly controlling the element 20. By doing this, a predetermined depth of cut is given to the tool 19 to perform draw cutting on the workpiece. In the return stroke, the piezoelectric element 20 is contracted so that tool 19 is retracted and returned to a position where it does not interfere with the workpiece. Thereafter, the workpiece is relatively moved in the direction perpendicular to the reciprocating direction of the slide 2 by suitable means (not shown), whereby the draw cutting is performed. The depth of cut of the tool 19 can be controlled in accordance with the magnitude of the voltage applied to the piezoelectric element 20.

Figure 8:
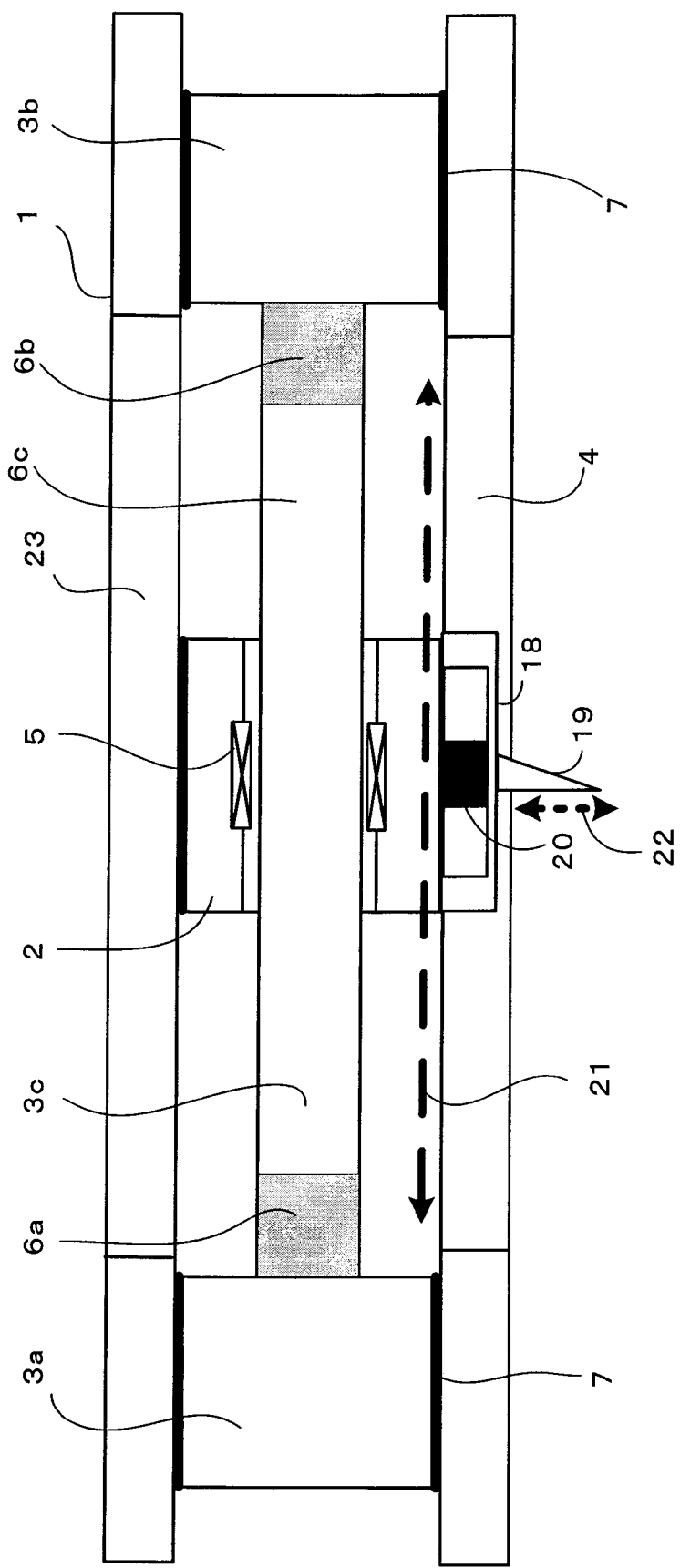
FIG. 8 is a sectional view of the reciprocating linear actuator according to any of the embodiments of the invention fitted with the tool shown in FIGS. 6A and 6B.
Figure 9:
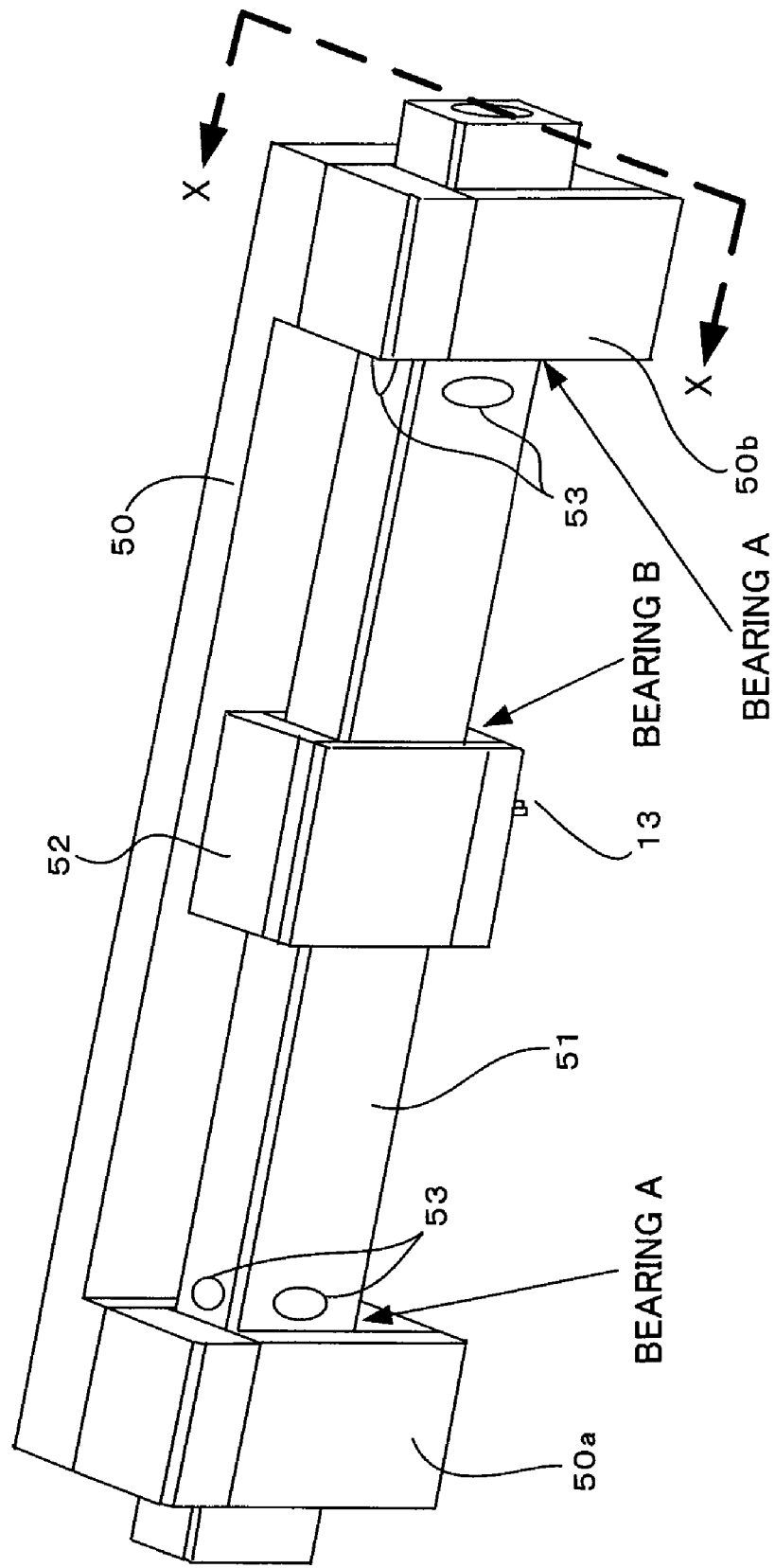
FIG. 9 is an external perspective view of an example of a prior art reciprocating linear actuator.

FIG. 8 is a sectional view of the reciprocating linear actuator according to any of the embodiments fitted with the tool shown in FIGS. 6A and 6B.

In order to supply electric power to the coil 5 on the slide 2 and the piezoelectric element 20 which causes the tool 19 to perform notching and retraction operations, a feeder receiving end (not shown) is disposed in a suitable position on the slide 2 that does not interfere with the machining operation by the tool 19. In addition to the slit 4 penetrated by the tool 19, a slot 23 for electric power and fluid supply may be formed in one side surface of the guide 1 opposite the other side surface where the slit 4 is provided so that the feeder can be connected to the feeder receiving end of the slide 2 through the slot 23. If a fluid bearing (air bearing) is used to support the slide 2 and the counter slide 3 within the guide 1, moreover, a pipe for supplying a fluid (air, nitrogen gas, etc.), like the feeder, is connected to the fluid inlets of the slide 2 and the bearing portions 3a and 3b of the counter slide 3 through the slot 23 for electric power and fluid supply. The connection of the feeder and the fluid supply pipe with the slide 2 and the counter slide 3 is not limited to the example described above. These elements should only be configured not to influence the workpiece machining operation by the tool 19.

What is claimed is:

1. A reciprocating linear actuator, comprising:
a hollow box-shaped guide;
a slide and a counter slide each movably disposed within said hollow box-shaped guide and movable in the direction parallel to a longitudinal axis of the hollow box-shaped guide;
a first bearing structure formed between an inner surface of the hollow box-shaped guide and an outer surface of the slide;
a second bearing structure formed between said inner surface of the hollow box-shaped guide and an outer surface of the counter slide; and
means for generating a driving force between the slide and the counter slide,
wherein said first and said second bearing structures are fluid bearings having the same sliding bearing surfaces on said inner surface of said hollow box-shaped guide, whereby, an external force acting on the slide is transmitted from the slide to the hollow box-shaped guide through the first bearing structure.

2. The reciprocating linear actuator according to claim 1, wherein said counter slide includes first and second bearing portions connected to each other and, wherein said driving force generating means drives said slide to move between the first and second bearing portions.

3. The reciprocating linear actuator according to claim 1, further comprising means for generating a repulsive force disposed between the slide and the counter slide, and wherein the repulsive force generated by the repulsive force generating means is used when the slide is reversed.

4. The reciprocating linear actuator according to claim 1, wherein the guide is provided with a lid on at least one end thereof, and a space surrounded by the inner surface of the guide, the lid and the counter slide is used as an air balance chamber such that the dead weight of the counter slide is canceled as a result of a pressure in the air balance chamber when the slide is driven vertically.

5. The reciprocating linear actuator according to claim 4, wherein the pressure in the air balance chamber is made negative when the air balance chamber is disposed on the upstream side of the counter slide and made positive when the air balance chamber is disposed on the downstream side of the counter slide.

6. The reciprocating linear actuator according to claim 1, wherein the slide is provided with means for mounting a tool and means for advancing and retracting the tool mounted by the tool mounting means in the direction perpendicular to the direction of movement of the slide.

7. The reciprocating linear actuator of claim 1, wherein said means for generating a driving force between the slide and the counter slide is an electrical linear motor.

8. The reciprocating linear actuator of claim 3, wherein said means for generating a repulsive force disposed between the slide and the counter slide is a permanent magnet.

* * * * *